(12) United States Patent
Bonilla Acevedo et al.

(10) Patent No.: US 11,207,952 B1
(45) Date of Patent: Dec. 28, 2021

(54) VEHICLE-RELATED VIRTUAL REALITY AND/OR AUGMENTED REALITY PRESENTATION

(71) Applicants: Dennis Rommel Bonilla Acevedo, Tempe, AZ (US); Adam Phillip Zuckerman, Potomac, MD (US)

(72) Inventors: Dennis Rommel Bonilla Acevedo, Tempe, AZ (US); Adam Phillip Zuckerman, Potomac, MD (US)

( * ) Notice: Subject to any disclaimer, the term of this patent is extended or adjusted under 35 U.S.C. 154(b) by 8 days.

(21) Appl. No.: 16/407,173

(22) Filed: May 8, 2019

Related U.S. Application Data

(63) Continuation of application No. 15/297,106, filed on Oct. 18, 2016, now abandoned, which is a
(Continued)

(51) Int. Cl.
*G02B 27/01* (2006.01)
*G06F 3/14* (2006.01)
*B60J 1/20* (2006.01)

(52) U.S. Cl.
CPC ............ *B60J 1/20* (2013.01); *G02B 27/0179* (2013.01); *G06F 3/14* (2013.01); *G02B 2027/0183* (2013.01)

(58) Field of Classification Search
None
See application file for complete search history.

(56) References Cited

U.S. PATENT DOCUMENTS 4,929,228 A 5/1990 Hendricks
5,966,680 A 10/1999 Butnaru
(Continued)

FOREIGN PATENT DOCUMENTS

DE 102014210170 A1 12/2015
DE 102014112077 A1 2/2016
(Continued)

OTHER PUBLICATIONS

King, Ian et al., "The Car Windshield Is Turning Into a Computer Screen", retrieved from the internet URL<http://www.bloomberg.com/news/articles/2015-01-22/the-car-windshield-is-turning-into-a-computer-screen>, Jan. 22, 2015, 5 pages.
(Continued)

*Primary Examiner* — Edward Martello
(74) *Attorney, Agent, or Firm* — Pillsbury Winthrop Shaw Pittman LLP (57) ABSTRACT

In some embodiments, environmental characteristics of a first real-world route in a first real-world environment (in which a vehicle is located) may be determined. A match between the first real-world route in the first real-world environment and a second real-world route in a second real-world environment may be determined based on similarities between the environmental characteristics of the first real-world route and environmental characteristics of the second real-world route. While the vehicle is on the first real-world route, virtual reality content representative of the second real-world route may be obtained for a virtual reality presentation within the vehicle on the first real-world route based on the determined match between the first real-world route and the second real-world route. While the vehicle is on the first real-world route, the virtual reality content representative of the second real-world route may be presented via one or more output devices of the vehicle.

20 Claims, 5 Drawing Sheets

Related U.S. Application Data continuation of application No. 15/172,117, filed on Jun. 2, 2016, now abandoned.

(56) References Cited

U.S. PATENT DOCUMENTS

| | | |
|---|---|---|
| 9,140,568 B2 | 9/2015 | Waite et al. |
| 2002/0099257 A1 | 7/2002 | Parker et al. |
| 2007/0034212 A1 | 2/2007 | Brendley et al. |
| 2007/0103461 A1 | 5/2007 | Suzuno et al. |
| 2008/0310707 A1 | 12/2008 | Kansal et al. |
| 2009/0002142 A1 | 1/2009 | Morimoto et al. |
| 2010/0292886 A1 | 11/2010 | Szczerba et al. |
| 2013/0009994 A1* | 1/2013 | Hill ................ G06N 3/006 345/633 |
| 2014/0036153 A1 | 2/2014 | Lier |
| 2015/0097860 A1 | 4/2015 | Alaniz et al. |
| 2015/0311935 A1 | 10/2015 | Witkowski et al. |
| 2015/0329122 A1* | 11/2015 | Sakoda ............ B60W 50/10 701/1 |
| 2015/0356770 A1 | 12/2015 | Wan |
| 2016/0048027 A1 | 2/2016 | Shpigelman |
| 2017/0103571 A1* | 4/2017 | Beaurepaire ............ G09B 9/02 |

FOREIGN PATENT DOCUMENTS

| | | |
|---|---|---|
| EP | 1977931 A1 | 10/2008 |
| EP | 2228089 A1 | 9/2010 |
| JP | 2008230575 A | 10/2008 |
| KR | 20150083354 A1 | 7/2015 |

OTHER PUBLICATIONS

Yvkoff, Liane, "Toyota demos augmented-reality-enhanced car windows", retrieved from the internet URL< http://www.cnet.com/roadshow/news/toyota-demos-augmented-reality-enhanced-car-windows/>, Jul. 21, 2011, 2 pages.

Coyne, J.T. et al., "Mitigating Motion Sickness in Ground Vehicles", Information Technology and Communications, 2008 NRL Review, retrieved from the internet URL< http://www.nrl.navy.mil/content_images/08Information_Coyne.pdf>, 2008, pp. 159-160.

Quinn, Stephanie Ann, "Mitigation of Motion Sickness Symptoms in 360° Indirect Vision Systems", Unpublished doctoral dissertation, University of Central Florida, Orlando, FL, Fall 2013, 202 pages.

Brumm, B. et al, "Reduction of vehicle display-induced motion sickness", SBIRSource, retrieved from the internet URL<https://sbirsource.com/sbir/topics/85350-reduction-of-vehicle-display-induced-motion-sickness>, 2016, 3 pages.

\* cited by examiner

VEHICLE-RELATED VIRTUAL REALITY AND/OR AUGMENTED REALITY PRESENTATION

RELATED APPLICATION

This application is a continuation of U.S. patent application Ser. No. 15/297,106, filed Oct. 18, 2016, which is a continuation of U.S. patent application Ser. No. 15/172,117, filed Jun. 2, 2016, both of which are hereby incorporated by reference in their entirety.

FIELD OF THE INVENTION

The invention relates to facilitating a vehicle-related virtual reality and/or augmented reality presentation.

BACKGROUND OF THE INVENTION

Augmented reality or augmented realities (AR) (also known as multimedia or computer-simulated reality which augments a user's field of view) is a computer technology that may, for example, overlay content, real or imagined, and simulates a user's physical presence and environment. Virtual reality or virtual realities (VR) (also known as immersive multimedia or computer-simulated reality) is a computer technology that may, for example, replicate an environment, real or imagined, and simulates a user's physical presence and environment. Although such immersive presentations can provide a lifelike experience, immersive presentations can cause sickness related to sensory conflict theory, which posits that sickness will occur when a user's perception of self-motion is based on incongruent sensory inputs caused by the presentations being at odds with the user's expectation based on prior experience. These and other drawbacks exist.

SUMMARY OF THE INVENTION

Aspects of the invention relate to methods, apparatuses, and/or systems for facilitating a vehicle-related virtual reality and/or augmented reality presentation. As used herein, a vehicle is a thing used for transporting people or goods, such as, but not limited to, a car, truck, cart, bus, plane, spacecraft, or boat. In certain embodiments, a virtual reality presentation may be based on a real-world route of a vehicle and may be caused to be provided via one or more output devices of the vehicle.

In some embodiments, a computer system may be programmed to: obtain destination information associated with the vehicle, wherein the destination information comprises information indicating a destination location of the vehicle; obtain virtual reality content based on the destination information, wherein the virtual reality content comprises one or more content portions related to one or more portions of a virtual route, the virtual route portions corresponding to one or more portions of a real-world route to the destination location; monitor the current location of the vehicle with respect to the real-world route portions; and cause, via one or more output devices of the vehicle, a presentation of a content portion related to a virtual route portion of the virtual route portions responsive to a determination, based on the monitoring, that the vehicle is on a real-world route portion that corresponds to the virtual route portion, wherein the content portions comprise the presented content portion.

In some embodiments, a computer system may be programmed to: obtain destination information associated with a vehicle, wherein the destination information comprises information indicating a destination location of the vehicle; obtain, based on the destination information, real-world route information associated with a real-world route to the destination location, wherein the real-world route information comprises information related to one or more portions of the real-world route to the destination location; determine, based on the real-world route information, one or more portions of a virtual route that correspond to the real-world route portions; generate virtual reality content based on the virtual route portions such that the virtual reality content comprises one or more content portions related to the virtual route portions; and cause a presentation of the virtual reality content to be provided via one or more output devices of the vehicle.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a", "an", and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
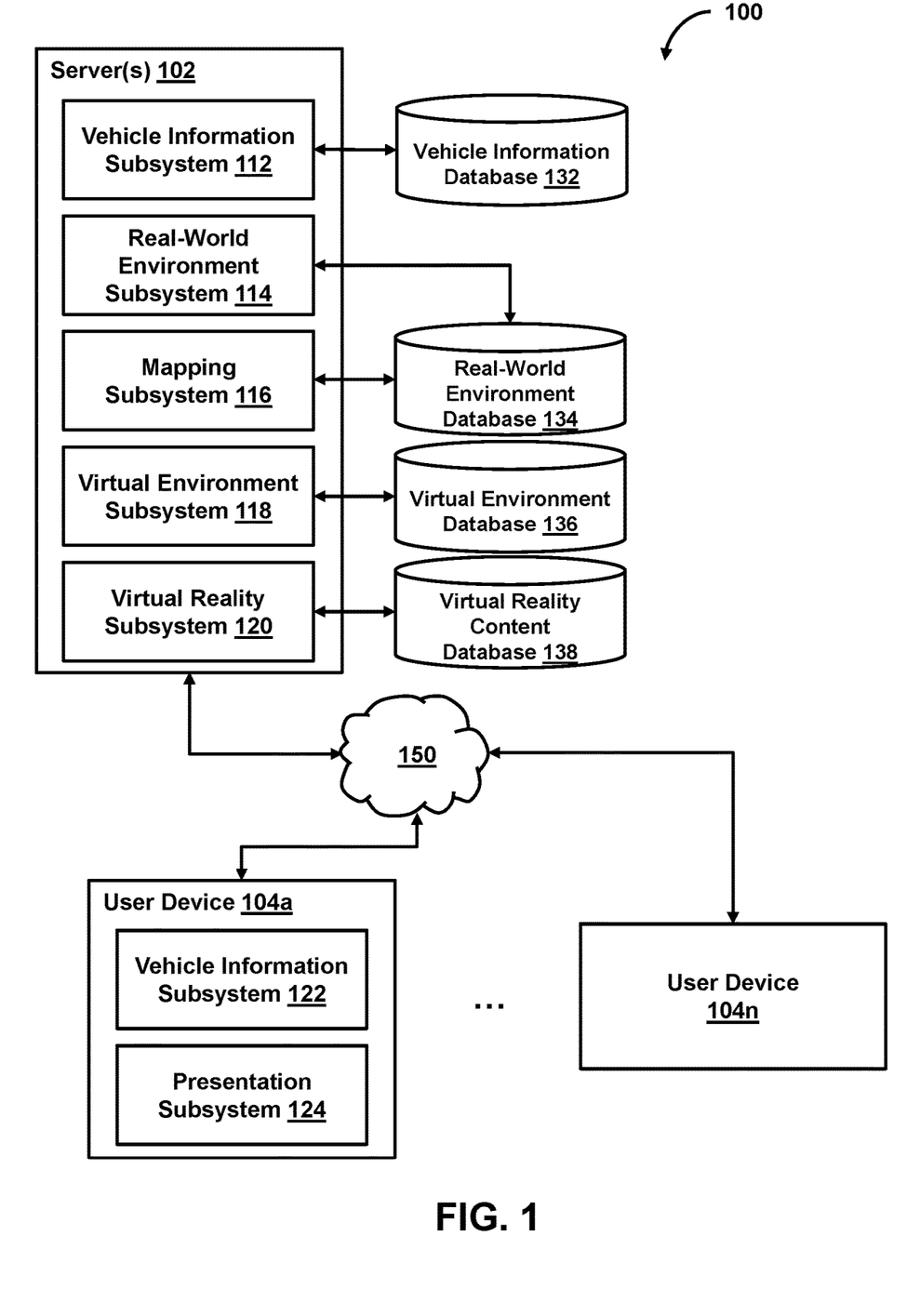
FIG. 1 shows a system for facilitating a vehicle-related virtual reality and/or augmented reality presentation, in accordance with one or more embodiments.

FIG. 1 shows a system 100 for facilitating a vehicle-related virtual reality and/or augmented reality presentation, in accordance with one or more embodiments. As shown in FIG. 1, system 100 may include server 102 (or multiple servers 102). Server 102 may include vehicle information subsystem 112, real-world environment subsystem 114, mapping subsystem 116, virtual environment subsystem 118, virtual reality subsystem 120, or other components.

In some embodiments, virtual reality subsystem 120 may include a virtual reality engine. As an example, the virtual reality engine may include a physics engine, a 3D display engine, a 2D display engine, an asset management architecture, input/output components, or other components. In some cases, the virtual reality engine may interface with databases managed by external systems, databases managed by internal systems (e.g., vehicle information database 132, real-world environment database 134, virtual environment database 136, virtual reality content database 138, or other databases), in-vehicle computer systems or other user devices 104, or other components of system 100 via the virtual reality engine's input/output components.

System 100 may further include user device 104 (or multiple user devices 104a-104n). User device 104 may include vehicle information subsystem 122, presentation subsystem 124, or other components. User device 104 may include any type of mobile terminal, fixed terminal, or other device. By way of example, user device 104 may include a desktop computer, a notebook computer, a tablet computer, a smartphone, a wearable device, an in-vehicle computer system, or other user device. Users may, for instance, utilize one or more user devices 104 to interact with server 102 or other components of system 100. In some embodiments, users may interact with a virtual environment, a virtual reality presentation (e.g., representing the virtual environment) or other presentation (e.g., augmented reality presentation), or other aspects of the system 100 via voice commands, gesture commands or other body actions (e.g., hand motions, facial gestures, eye motions, etc.), in-vehicle mounted pressure-sensitive and haptic-responsive touch displays, physical buttons or knobs, smartphone application inputs, or other input techniques.

It should be noted that, while one or more operations are described herein as being performed by components of server 102, those operations may, in some embodiments, be performed by components of user device 104 or other components of system 100. As an example, in some embodiments, user device 104 may include virtual reality component 120 (and/or its virtual reality engine) or other components of server 102. It should also be noted that while one or more operations are described herein as being performed by components of user device 104, those operations may, in some embodiments, be performed by components of server 102 or other components of system 100.

Vehicle-Related Virtual Reality and/or Augmented Reality Presentation

In some embodiments, a presentation of virtual reality content or other content may be provided such that the presentation reflects characteristics of a virtual environment. As an example, the virtual environment may include one or more simulated experiences, such as (1) a roller coaster experience, (2) an underwater exploration experience, (3) a volcano exploration experience, (4) a night sky experience, (5) a desert driving experience, (6) a vehicle shifting experience as if the vehicle (to which the presentation is related) is another make and model or another mode of transportation (e.g., if the vehicle is a car, the vehicle may "shift" into a boat, train, plane, or spaceship), (7) a time shifting experience as if the vehicle (to which the presentation is related) is in the same location at a different time period, (8) a 360-degree panoramic view of pre-defined user-selected images or other media (e.g., videos of concerts, sporting events, etc.), or (9) other simulated experiences.

In some embodiments, data inputs for the virtual environment or the virtual reality presentation may include geo-positional data (e.g., Global Positioning System (GPS) data, cell ID data, triangulation data, etc.), LIDAR data (e.g., exterior environment LIDAR data, indoor environment LIDAR data, etc.), in-vehicle sensors data (e.g., data from accelerometers, gyroscopes, etc.), photogrammetric reconstruction data, positional audio data, interior occupant data, or other data inputs. Such data inputs may be obtained from the vehicle of a user to which the virtual reality presentation is provided, one or more other vehicles (e.g., vehicles proximate the user's vehicle or other vehicles), or other sources. In some embodiments, a model of the interior or exterior of the user's vehicle may be presented during the virtual reality presentation to the user. Additionally, or alternatively, one or more models of the interior or exterior of one or more other vehicles (e.g., vehicles proximate the user's vehicle) may be presented during the virtual reality presentation to the user (e.g., to enable the user to see other nearby vehicles as part of the virtual reality presentation).

In some embodiments, storage of data inputs or information derived therefrom may be provided on the user's vehicle, one or more other vehicles, one or more remote databases (e.g., vehicle information database 132, real-world environment database 134, virtual environment database 136, virtual reality content database 138, etc.), or other components of the system 100. In some embodiments, data inputs or information derived therefrom may be stored on a distributed network, such as a blockchain-based distributed network or other distributed network. As an example, onboard storage redundancy may allow for vehicle-to-vehicle updates through a distributed database and encrypted blockchain transactions.

In some embodiments, vehicle information subsystem 112 may obtain information related to one or more vehicles (e.g., from the vehicles via their in-vehicle computer systems or other user devices 104, from vehicle information database 132, or other source) and/or store such vehicle-related information (e.g., in vehicle information database 132 or other storage). As an example, such vehicle-related information may include (1) a make and model of a vehicle, (2) specifications of the vehicle (e.g., physical dimensions, vehicle component details, etc.), (3) history information associated with the vehicle (e.g., services performed on the vehicle, current and past owners, accident history, etc., and/or respective dates/times associated thereof), (4) location information indicating one or more locations associated with the vehicle (e.g., past locations, the current location, and/or predicted future locations of the vehicle and/or respective dates/times associated therewith), (5) route information indicating one or more routes taken, being taken, or to be taken by the vehicle (e.g., past routes, a current route, and/or predicted future routes and/or respective dates/times associated therewith), (6) destination information indicating one or more destinations of the vehicle (e.g., a current intended destination, past locations, and/or predicted future locations of the vehicle and/or respective dates/times associated therewith), or (7) other vehicle-related information.

In some embodiments, real-world environment subsystem 114 may obtain information related to a real-world environment (e.g., from real-world environment database 134 or other source) and/or stored such real-world environment information. Such real-world-environment information may include (1) weather information indicating past, current, and/or predicted future weather of the real-world environment (e.g., the state of the atmosphere at one or more places or times such as temperature, humidity, atmospheric pressure, sunshine, wind, rain, snow, or other characteristics), (2) landscape information indicating past, current, and/or predicted future landscape features of the real-world environment (e.g., roads or other paths, conditions of the roads or other paths, landmarks, water bodies, indoor environment landscape, etc., and/or their physical dimensions or other characteristics), (3) object information indicating objects in the real-world environment (e.g., animals, vehicles, pedestrians, or other objects) or (4) other real-world environment information.

In some embodiments, mapping subsystem 116 may perform one or more map-related operations, such as determining one or more routes from one location to another, determining one or more estimated times of arrival to a destination or to a particular route portion (e.g., the next route portion or another portion of a route on which a vehicle is currently traveling), or other map-related operations.

In some embodiments, virtual environment subsystem 118 may obtain information related to a virtual environment (e.g., from virtual environment database 136 or other source) and/or store such virtual environment information. Such virtual environment information may include (1) weather information indicating past, current, and/or predicted future weather of the virtual environment, (2) landscape information indicating past, current, and/or predicted future landscape features of the virtual environment, (3) object information indicating objects in the virtual environment, or (4) other virtual environment information.

In some embodiments, real-world environment subsystem 114 may obtain real-world route information associated with a real-world route to a destination location of a vehicle. In some embodiments, vehicle information subsystem 112 may obtain destination information associated with a vehicle, where the destination information includes information indicating the destination location as the intended destination of the vehicle. Real-world environment subsystem 114 may provide the destination information (e.g., the information indicating the destination location) to mapping subsystem 116 to determine one or more real-world routes available for the vehicle to travel to the destination location. When mapping subsystem 116 returns the available real-world routes, real-world environment subsystem 114 may query the real-world environment database 134 (or other source) for real-world route information associated with at least one of the available real-world routes, such as information indicating the current weather along the associated route, information indicating one or more landscape features along the associated route (e.g., landscape features visible while traveling along the associated route), or other real-world environment information with respect to the associated route. Responsive to the query, real-world environment subsystem 114 may obtain the associated real-world route information.

In some embodiments, real-world environment subsystem 114 may cause a presentation of one or more real-world routes (available for a vehicle to travel to a destination location) to be provided to a user (e.g., via the user's in-vehicle computer system or other user device 104), and enable the user to select one of the available real-world routes (e.g., via vehicle information subsystem 122 or presentation subsystem 124 of user device 104). Responsive to the user selection, real-world environment subsystem 114 may query the real-world environment database 134 (or other source) for real-world route information associated with the selected real-world route to obtain the associated real-world route information. In some embodiments, real-world environment subsystem 114 may query the real-world environment database 134 (or other source) for real-world route information associated with one or more real-world routes (available for a vehicle to travel to a destination location) prior to user selection of one of the available real-world routes or presentation of the available real-world routes to the user for the user's selection. In some cases, mapping subsystem 116 may determine the most optimum real-world routes from a starting destination location (e.g., the vehicle's current location) to the destination location. Real-world environment subsystem 114 may query the real-world environment database 134 (or other source) for real-world route information associated with multiple ones of the real-world routes (e.g., some or all of the determined "most optimum" real-world routes) prior to the user's selection of one of the real-world routes. In this way, delay from the time of the user's selection to the obtainment of the real-world route information may be reduced. As an example, because the source(s) of such real-world route information is queried prior to the user's selection (or prior to the presentation of the real-world routes for the user's selection), some or all of the real-world route information may be obtained by the time of the user's selection and/or ready for use responsive to the user's selection of at least one of the real-world routes.

In some embodiments, virtual environment subsystem 118 may determine one or more portions of a virtual route that correspond to one or more portions of a real-world route. Virtual reality subsystem 120 may generate virtual reality content based on the virtual route portions such that the virtual reality content includes one or more content portions related to the virtual route portions. The virtual reality content may include audio content portions, visual content portions, haptic content portions, or other content portions. As an example, if it is raining along a virtual route portion, a content portion related to the virtual route portion may include audio content of rain sounds, video content of rainy weather, or other rain-related content. If a virtual route portion has one or more particular curves, turns, inclines, declines, path conditions (e.g., wet or icy roads, dirt paths, etc.), or other landscape features, a content portion related to the virtual route portion may include video content of the landscape features or other landscape-related content.

Virtual reality subsystem 120 may cause a presentation of the virtual reality content to be provided via one or more output devices. In some embodiments, virtual reality subsystem 120 may cause the presentation of the virtual reality content to be provided via one or more output devices of a vehicle (e.g., the vehicle traveling the real-world route). As an example, the output devices of the vehicle may include windshield-integrated output devices, window-integrated output devices, door-integrated output devices, seat-integrated output devices, floor-integrated output devices, ceiling-integrated output devices, output devices integrated on the interior surface of the vehicle, output devices integrated on the exterior surface of the vehicle, or other output devices of the vehicle. As such, the presentation of the virtual reality content may be caused to be provided via at least one of the foregoing output devices of the vehicle. In this way, for example, passengers within the vehicle may be unencumbered from requirements to obtain and maintain their own non-vehicle devices. In doing so, for instance, passengers may have a shared immersive experience which in turn will avoid challenges such as challenges related to timing (e.g., experience synchronization), uniqueness (e.g., different experiences perceived by different passengers at the same time), conflict, and power availability (e.g., devices running out of power). In some cases, vehicle output devices may include light field or holographic displays to enable immersion during multi-user use, negating the need for a single user head-mounted display. Multi-user use of virtual reality subsystem output may include augmented reality views of real-world environments for situational awareness (e.g., map overlays and external object meta-data identification).

Figure 2A:
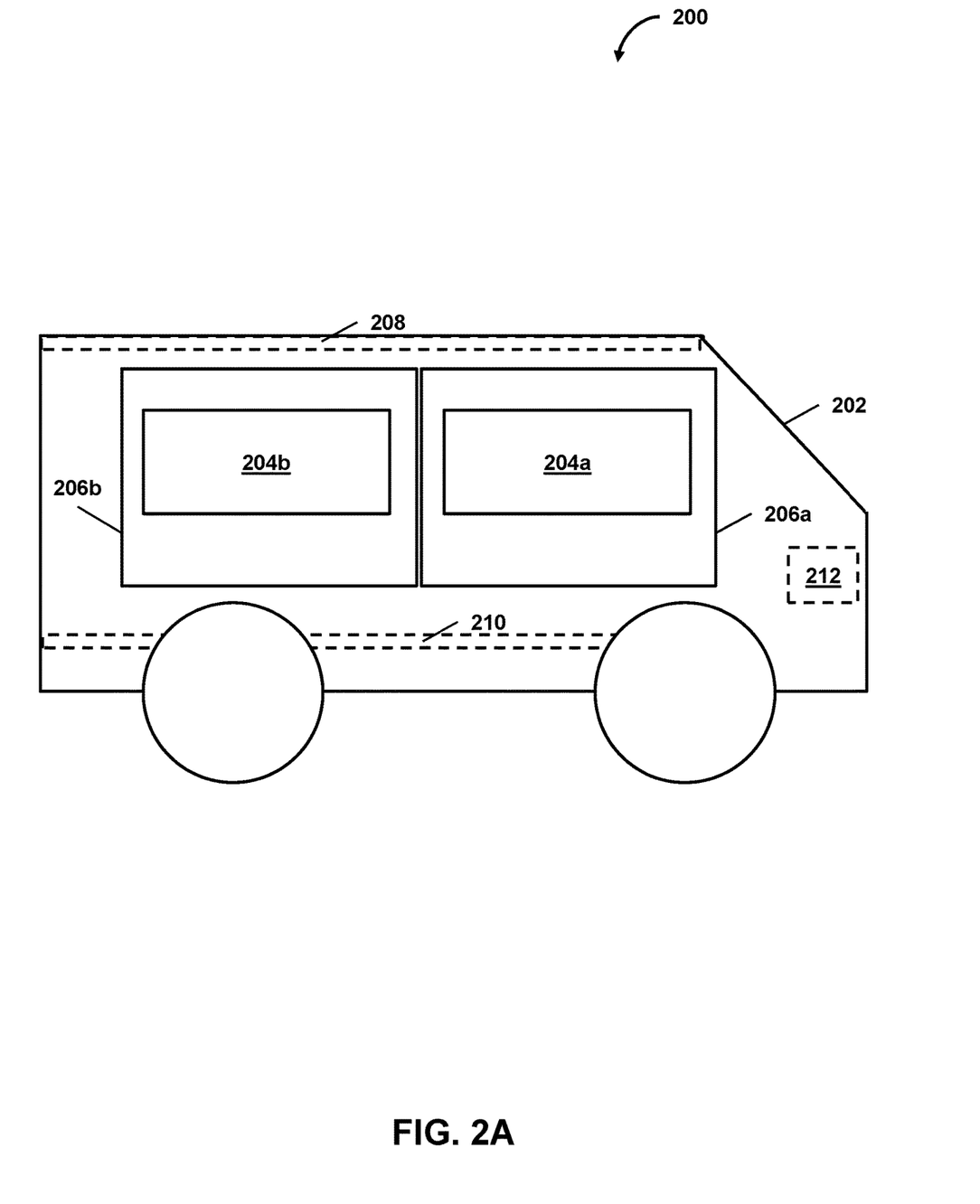
FIG. 2A shows a vehicle including an in-vehicle computer system and one or more output devices via which a virtual reality presentation is provided, in accordance with one or more embodiments.

As shown in FIG. 2A, for example, vehicle 200 may comprise one or more components, including windshield 202, windows 204, doors 206, ceiling 208, floor 210, or other components. As an example, one or more of windshield 202, windows 204, doors 206, ceiling 208, floor 210, or other components may be output devices of vehicle 200 via which the presentation of the virtual reality content may be provided. One or more of the foregoing vehicle components may include one or more displays, speakers, haptic feedback devices, or other output devices (e.g., image projection devices or other output devices). In some cases, the displays may be "windows" to see the real-world exterior of vehicle 200 (e.g., the displays may additionally or alternatively act as a pass-through device) or to see one or more simulated views of a virtual environment. In some cases, the displays may include one or more light field displays (e.g., "holographic" displays). In some cases, the light field displays may be configured to emit different images into different directions to produce many different perspective views (e.g., hundreds or thousands of different perspective views) so that the image and motion presented via the displays appear consistent regardless of the viewer's position. In this way, for example, in-vehicle presentations via such displays may appear consistent to multiple users in vehicle 200 regardless of their positions or orientations.

In some cases, with respect to FIG. 2A, virtual reality subsystem 120 may provide the virtual reality content to in-vehicle computer system 212 to cause the virtual reality content to be presented via the output devices of vehicle 200. As an example, in-vehicle computer system 212 may include presentation subsystem 124, which may route the presentation of the virtual reality content to respective ones of the output devices of vehicle 200 to provide the virtual reality presentation to a user. In some cases, presentation subsystem 124 may monitor the user's position within the vehicle, the user's eye movements, the user's voice, or other aspects of the user (e.g., via one or more cameras or audio systems), and modify the presentation of the virtual reality content based on the monitoring. As an example, presentation subsystem 124 may utilize cues from the user's eyes or voice to update the view of the virtual environment (reflected by the virtual reality content) presented to the user.

In some embodiments, virtual reality subsystem 120 may cause the presentation of the virtual reality content to be provided via one or more non-vehicle output devices. In some cases, the non-vehicle output devices may include one or more smart phones, wearable devices (e.g., wrist bands, glasses or other head-mounted displays, etc.), or other non-vehicle output devices.

In some embodiments, virtual environment subsystem 118 may determine one or more portions of a virtual route (e.g., to be used to obtain related virtual reality content) based on real-world route information associated with a real-world route. As an example, the real-world route information may include weather information indicating weather for one or more portions of the real-world route, landscape information indicating landscape features for the real-world route portions, object information indicating objects along the real-world route portions, or other real-world route information. Virtual environment subsystem 118 may determine one or more portions of the virtual route that correspond to the real-world route portions such that the virtual route portions has one or more characteristics that are the same or similar to one or more characteristics of the respective real-world route portions. In some cases, for example, if it is raining along a real-world route portion, a virtual route portion that is determined to correspond to the real-world route portion may be a virtual route portion that has characteristics similar to the intensity of the rain along the real-world route portion. If a real-world route portion has one or more particular curves, turns, inclines, declines, path conditions, or other landscape features, a virtual route portion that is determined to correspond to the real-world route portion may be a virtual route portion that has characteristics similar to the particular curves, turns, inclines, declines, path conditions, or the other landscape features.

Figure 2B:
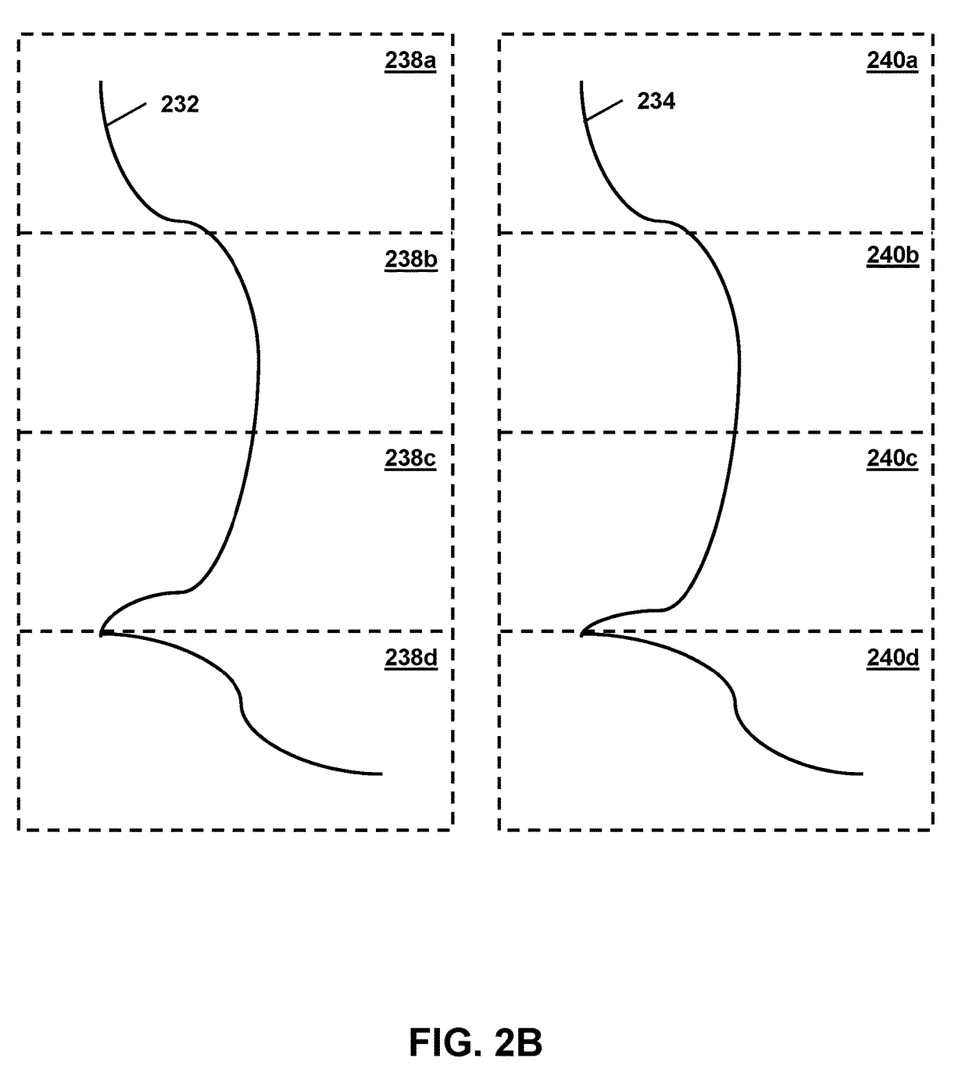
FIG. 2B shows corresponding real-world and virtual routes, in accordance with one or more embodiments.

As shown in FIG. 2B, for example, route 232 may be a real-world route from a starting location of a vehicle to a destination location of the vehicle, and route 234 may be a virtual route that comprises one or more virtual route portions (e.g., four virtual route portions of virtual route 234) that correspond to one or more portions of real-world route 232 (e.g., four real-world route portions of real-world route 232). The virtual route portions (e.g., of virtual route 234) may be selected to be used to obtain related virtual reality content based on a determination that the virtual route portions are similar to the real-world route portions (e.g., of real-world route 232). As an example, it may be determined that the curves and turns of the four virtual route portions are similar to the curves and turns of the four real-world route portions. In one use case, based on their respective similar curves and/or turns, the portion of real-world route 232 in section 238a may match the portion of virtual route 234 in section 240a, the portion of real-world route 232 in section 238b may match the portion of virtual route 234 in section 240b, the portion of real-world route 232 in section 238c may match the portion of virtual route 234 in section 240c, and the portion of real-world route 232 in section 238d may match the portion of virtual route 234 in section 240d. As such, for instance, information associated with the portions of virtual route 234 may be utilized to generate and/or select virtual reality content to provide a virtual reality presentation related to real-world route 232 and/or a vehicle traveling real-world route 232. In addition, the foregoing matching of environmental characteristics (e.g., similar curves, inclines/declines, rain sounds, or other environmental characteristics) can reduce sickness in a number of scenarios, such as where the virtual route represents another real-world route different from the vehicle's current real-world route, where the virtual route represents the vehicle's real-world route in a different time (e.g., where characteristics of the real-world route may have changed over time so that matching is needed to mitigate virtual reality sickness), and other scenarios.

In some embodiments, vehicle information subsystem 112 or 122 may monitor the current location of a vehicle, the current orientation of the vehicle, or other aspect of the vehicle, and virtual reality subsystem 120 (or presentation subsystem 124) may cause a virtual reality presentation to be provided based on the current location, the current orientation, the changes to the current location or orientation of the vehicle, or other information from such monitoring. In some embodiments, the virtual reality presentation may include a presentation of content relevant to the current location or orientation of the vehicle such that the content is presented at the time that the vehicle is at that particular location or orientation relevant to the presented content. As an example, vehicle information subsystem 122 of the vehicle (or its in-vehicle computer system or other user device 104 of a user in the vehicle) may obtain sensor data from one or more of the vehicle's sensors, such as the vehicle's GPS, accelerometers, gyroscopes, or other sensors, to obtain information regarding the vehicle's current location and orientation. In some cases, vehicle information subsystem 122 may periodically provide the current location and orientation information to vehicle information subsystem 112, which may forward the current location and orientation information to virtual reality subsystem 120. Virtual reality subsystem 120 may provide virtual reality content (or portions thereof) to presentation subsystem 124 of the vehicle (or its in-vehicle computer system or other user device 104 of a user in the vehicle) based on the current location and orientation. In some cases, presentation subsystem 124 may select which portions of the virtual reality content to be presented via one or more output devices of the vehicle based on the current location and orientation of the vehicle.

In some embodiments, the current location of the vehicle may be monitored with respect to one or more real-world route portions of a real-world route (e.g., on which a vehicle is currently traveling). Based on the monitoring, a determination of which one of the real-world route portions the vehicle is currently traveling may be effectuated. A content portion related to a virtual route portion (e.g., of a virtual route corresponding to the real-world route) may be caused to be presented responsive to a determination that the vehicle is on a real-world route portion (of the real-world route) that corresponds to the virtual route portion. In some embodiments, virtual reality subsystem 120 may provide virtual reality content that includes one or more content portions related to one or more virtual route portions (e.g., of the virtual route corresponding to the real-world route) to user device 104 (e.g., an in-vehicle computer system of the vehicle). Additionally, or alternatively, virtual reality subsystem 120 may provide one or more instructions to user device 104 indicating when to present each of the respective content portions (e.g., based on the vehicle's current location, the vehicle's current orientation, etc.). As an example, the instructions may include an instruction to present a first content portion related to a first virtual route portion when the vehicle reaches a first real-world route portion to which the first virtual route portion corresponds, an instruction to present a second content portion related to a second virtual route portion when the vehicle reaches a second real-world route portion to which the second virtual route portion corresponds, and so on. The first content portion may include content depicting one or more characteristics of the first virtual route, the second content portion may include content depicting one or more characteristics of the second virtual route, and so on. Based on the instructions obtained from virtual reality subsystem 120, presentation subsystem 124 of user device 104 may present, via one or more output devices of the vehicle, the content portions when the vehicle reaches the respective real-world route portions.

In some embodiments, virtual reality content (provided for presentation to a user of a vehicle) may represent a real-world environment different from the real-world environment in which the vehicle is located. As an example, the vehicle may be currently located in a first real-world environment (e.g., an area in the United States or other country), and the virtual reality content (provided for presentation to a user of the vehicle) may be a virtual representation of a second real-world environment (e.g., an area in the Swiss Alps or other area other than the first real-world environment) different from the first real-world environment. For example, the virtual reality content may be based on one or more characteristics of the second real-world environment.

In some embodiments, a virtual environment representing the second real-world environment (e.g., an area in the Swiss Alps) may be generated based on the characteristics of the second real-world environment. As an example, information related to the respective real-world environments (e.g., weather information, landscape information, object information, or other information) may be collected and/or stored in real-world environment database 134 (e.g., by real-world environment subsystem 114), and a virtual environment (representing a real-world environment) may be generated based on the respective real-world environment information. In some cases, real-world environment subsystem 114 may obtain the real-world environment information for the second real-world environment from real-world environment database 134, and virtual environment subsystem 118 may generate the virtual environment (representing the second real-world environment) based on the real-world environment information. As an example, virtual environment subsystem 118 may generate information related to the virtual environment based on the real-world environment information and/or store the virtual environment information in virtual environment database 136. Virtual reality subsystem may generate the virtual reality content based on the virtual environment information so that the virtual reality content reflects the virtual environment (representing the second real-world environment).

In some cases, real-world environment subsystem 114 may periodically update the real-world environment information for the respective real-world environments. As an example, real-world environment subsystem 114 may monitor a real-world environment and periodically collect and update the real-world environment information based on the monitoring of the real-world environment. Based on the updated real-world environment information for the second real-world environment, for example, virtual environment subsystem 118 may periodically update the virtual environment information for the virtual environment (representing the second real-world environment). In this way, virtual reality content (generated based on the updated virtual environment information) may reflect one or more changes in the second real-world environment. In some cases, the virtual reality content may be dynamically updated in real-time as the virtual environment information and/or the real-world environment information is updated (e.g., based on real-time monitoring of the second real-world environment).

In some embodiments, virtual reality content (provided for presentation to a user of a vehicle) may represent a real-world environment in which the vehicle is located. As an example, the vehicle may be currently located in a first real-world environment (e.g., an area in the United States or other country), and the virtual reality content (provided for presentation to a user of the vehicle) may be a virtual representation of the first real-world environment that is based on one or more characteristics of the first real-world environment. In some embodiments, the virtual reality content may be a virtual representation of the first real-world environment at a time different from the current time where the virtual reality content is based on one or more characteristics of the first real-world environment at the different time. As an example, the different time may be a time prior to the current time. As another example, the different time may be a time subsequent to the current time.

In some embodiments, a virtual environment representing the first real-world environment (e.g., an area in the United States or other country at a time different from the current time) may be generated based on the characteristics of the first real-world environment at the different time. As an example, weather information, landscape information, object information, or other information related to the first real-world environment at one or more times prior to the current time or subsequent to the current time may be collected and/or stored in real-world environment database 134 (e.g., by real-world environment subsystem 114), and a virtual environment (representing a real-world environment) may be generated based on the real-world environment information. In some cases, real-world environment subsystem 114 may obtain the real-world environment information for the first real-world environment from real-world environment database 134, and virtual environment subsystem 118 may generate the virtual environment (representing the first real-world environment) based on the real-world environment information. As an example, virtual environment subsystem 118 may generate information related to the virtual environment based on the real-world environment information and/or store the virtual environment information in virtual environment database 136. Virtual reality subsystem may generate the virtual reality content based on the virtual environment information so that the virtual reality content reflects the virtual environment (e.g., representing the first real-world environment at the prior times, representing the first real-world environment at the subsequent times, etc.).

In one scenario, where the virtual environment represents the first real-world environment at one or more times prior to the current time, the weather and the landscape of the virtual environment (reflected by the presented virtual reality content) may correspond to the weather and the landscape of the first real-world environment from the previous week, previous month, previous year, or other prior time (e.g., 5 years ago, 10 years ago, etc.). As an example, a virtual reality presentation with respect to a vehicle driving along a particular real-world route, may include a presentation of virtual reality content that reflects the weather and landscape from the perspective of a vehicle driver or passenger driving along the real-world route at the prior time. If, for example, the virtual reality content is intended to reflect the weather along the real-world route from the previous year, and it was raining along the real-world route on the same day a year ago, then the virtual reality content may reflect the rain conditions along the real-world route from the previous year (e.g., virtual reality content that depicts the rain conditions at 3 pm exactly one year ago when the current time is 3 pm, the rain conditions at 4 pm exactly one year ago when the current time is 4 pm, etc.). Additionally, or alternatively, if the landscape along the real-world route a year ago is different from the landscape of the current time, then the virtual reality content may reflect the different features of the landscape from the previous year (e.g., virtual reality content that depicts the features of the landscape as they existed a year ago, such as buildings, forests, hills, rivers, streams, or other features of the landscape as they existed a year ago).

In another scenario, wherein the virtual environment represents the first real-world environment at one or more times subsequent to the current time, the weather and the landscape of the virtual environment (reflected by the presented virtual reality content) may correspond to the weather and the landscape of the first real-world environment predicted for the subsequent week, subsequent month, subsequent year, or other subsequent time (e.g., 5 years later, 10 years later, etc.). As an example, a virtual reality presentation with respect to a vehicle driving along a particular real-world route, may include a presentation of virtual reality content that reflects the weather and landscape from the perspective of a vehicle driver or passenger driving along the real-world route at the subsequent time. If, for example, the virtual reality content is intended to reflect the weather along the real-world route for the subsequent year, and it is predicted to be snowing along the real-world route on the same day a year later, then the virtual reality content may reflect the snow conditions along the real-world route for the subsequent year (e.g., virtual reality content that depicts the snow conditions at 3 pm exactly one year later when the current time is 3 pm, the snow conditions at 4 pm exactly one year later when the current time is 4 pm, etc.). Additionally, or alternatively, the virtual reality content may reflect the predicted features of the landscape one year later (e.g., virtual reality content that depicts the features of the landscape as they are predicted to exist a later year, such as buildings, forests, hills, swamps, rivers, streams, or other features of the landscape predicted to exist a year later). The predictions may, for example, be based on historic weather patterns (e.g., during the same time of the year), construction plans, or other information.

In some embodiments, augmented reality technology may be utilized to supplement or alternatively provide a presentation to a user. In some embodiments, virtual reality subsystem 120 may provide augmented reality content to user device 104 (e.g., in-vehicle computer system 212 or other user device 104), which may present the augmented reality content via its presentation subsystem 124 and one or more output devices (e.g., of the vehicle, another user device in the vehicle, etc.). The augmented reality content may include vehicle diagnostic reports, trip-related data (e.g., elapsed time since the start of the trip, vehicle speed, estimated time of arrival at the destination, available or alternative routes, etc.), real-world or virtual environment information, or other content.

Example Flowcharts

Figure 3:
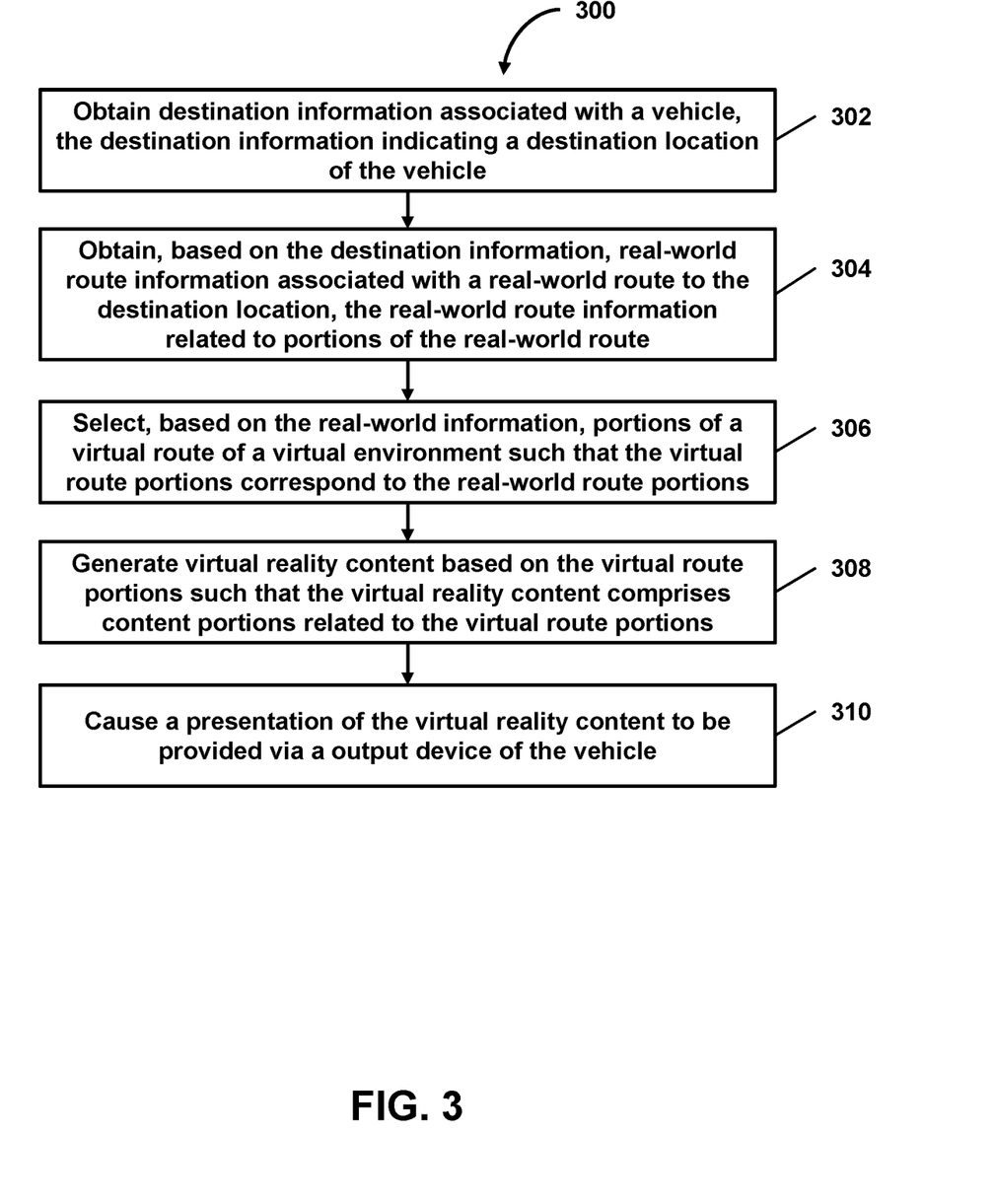
FIG. 3 shows a flowchart of a method of facilitating a virtual reality presentation based on a real-world route of a vehicle, in accordance with one or more embodiments.
Figure 4:
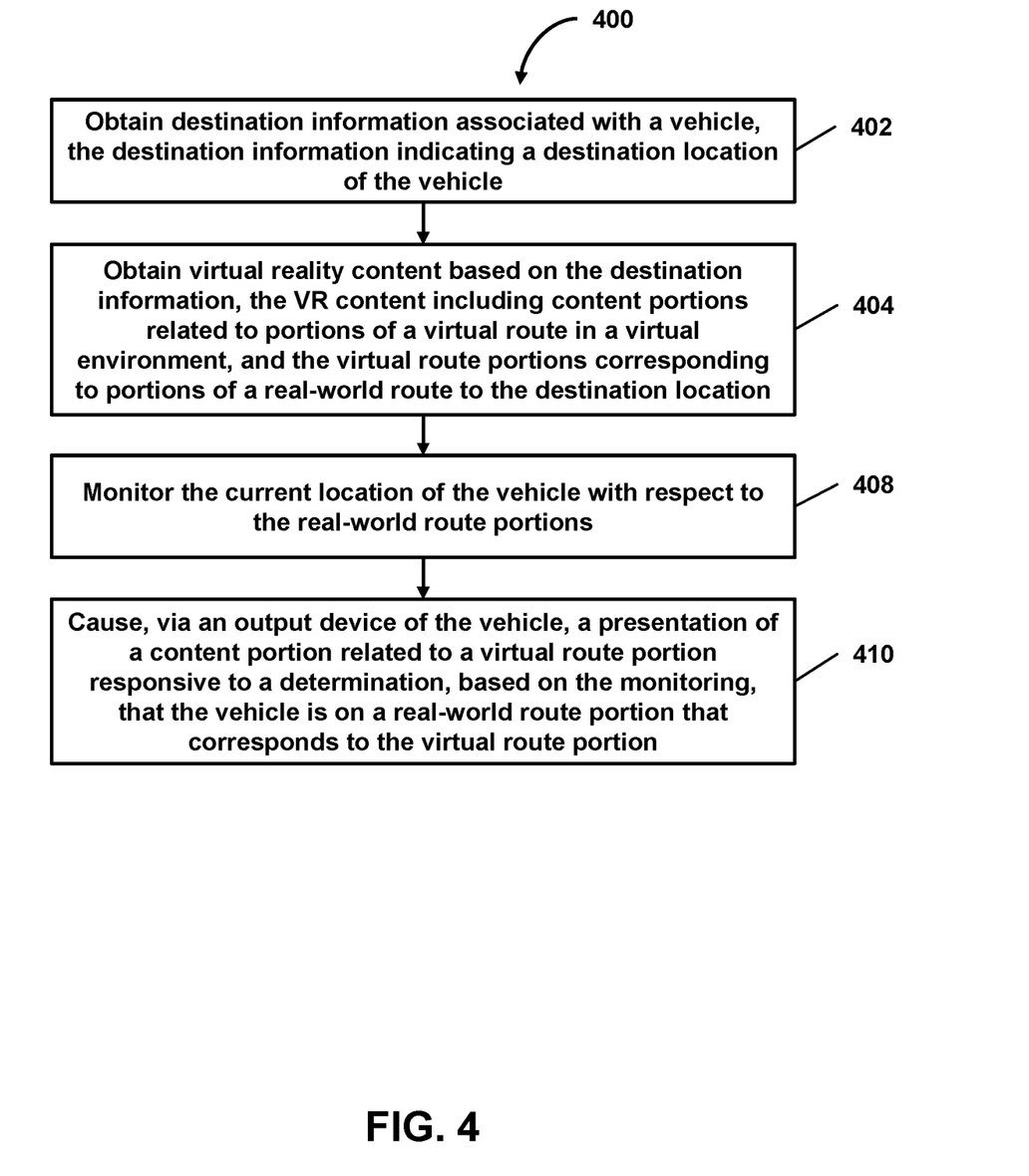
FIG. 4 shows a flowchart of a method of facilitating a virtual reality presentation based on the current location of a vehicle along a real-world route to a destination of the vehicle, in accordance with one or more embodiments.

FIGS. 3-4 include example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 3 shows a flowchart of a method 300 of facilitating a virtual reality presentation based on a real-world route of a vehicle, in accordance with one or more embodiments.

In an operation 302, destination information associated with a vehicle may be obtained. As an example, the destination information may include information indicating a destination location of the vehicle. Operation 302 may be performed by a vehicle information subsystem that is the same as or similar to vehicle information subsystem 112, in accordance with one or more embodiments.

In an operation 304, real-world route information associated with a real-world route to the destination location may be obtained. As an example, the real-world route information may include information related to one or more portions of the real-world route to the destination location. Operation 304 may be performed by a real-world environment subsystem that is the same as or similar to real-world environment subsystem 114, in accordance with one or more embodiments.

In an operation 306, one or more portions of a virtual route that correspond to the real-world route portions may be determined based on the real-world route information. Operation 306 may be performed by a virtual environment subsystem that is the same as or similar to virtual environment subsystem 118, in accordance with one or more embodiments.

In an operation 308, virtual reality content may be generated based on the virtual route portions. As an example, the virtual reality content may be generated such that the virtual reality content includes one or more content portions related to the virtual route portions. Operation 308 may be performed by a virtual reality subsystem that is the same as or similar to virtual reality subsystem 120, in accordance with one or more embodiments.

In an operation 310, a presentation of the virtual reality content may be caused to be provided via one or more output devices of the vehicle. As an example, the output devices of the vehicle may include windshield-integrated output devices, window-integrated output devices, door-integrated output devices, seat-integrated output devices, floor-integrated output devices, ceiling-integrated output devices, output devices integrated on the interior surface of the vehicle, output devices integrated on the exterior surface of the vehicle, or other output devices of the vehicle. As such, the presentation of the virtual reality content may be caused to be provided via at least one of the foregoing output devices of the vehicle. Operation 310 may be performed by a virtual reality subsystem that is the same as or similar to virtual reality subsystem 120, in accordance with one or more embodiments.

FIG. 4 shows a flowchart of a method 400 of facilitating a virtual reality presentation based on the current location of a vehicle along a real-world route to a destination of the vehicle, in accordance with one or more embodiments.

In an operation 402, destination information associated with a vehicle may be obtained. As an example, the destination information may include information indicating a destination location of the vehicle. Operation 402 may be performed by a vehicle information subsystem that is the same as or similar to vehicle information subsystem 122, in accordance with one or more embodiments.

In an operation 404, virtual reality content may be obtained based on the destination information. As an example, the virtual reality content may include one or more content portions related to one or more portions of a virtual route. The virtual route portions may correspond to one or more portions of a real-world route to the destination location of the vehicle. Operation 404 may be performed by a presentation subsystem that is the same as or similar to presentation subsystem 124, in accordance with one or more embodiments.

In an operation 406, the current location of the vehicle may be monitored. As an example, the current location of the vehicle may be monitored with respect to the real-world route portions (e.g., which route portion the vehicle is currently on, the current location of the vehicle relative to the next route portion, etc.). Operation 406 may be performed by a vehicle information subsystem that is the same as or similar to vehicle information subsystem 122, in accordance with one or more embodiments.

In an operation 408, a presentation of a content portion (of the content portions) related to a virtual route portion (of the virtual route portions) may be caused to be provided via one or more output devices of the vehicle responsive to a determination, based on the monitoring, that the vehicle is on a real-world route portion that corresponds to the virtual route portion. As an example, the output devices of the vehicle may include windshield-integrated output devices, window-integrated output devices, door-integrated output devices, seat-integrated output devices, floor-integrated output devices, ceiling-integrated output devices, output devices integrated on the interior surface of the vehicle, output devices integrated on the exterior surface of the vehicle, or other output devices of the vehicle. As such, the presentation of the virtual reality content may be caused to be provided via at least one of the foregoing output devices of the vehicle. Operation 408 may be performed by a presentation subsystem that is the same as or similar to presentation subsystem 124, in accordance with one or more embodiments.

In some embodiments, the various computers and subsystems illustrated in FIG. 1 may include one or more computing devices that are programmed to perform the functions described herein. The computing devices may include one or more electronic storages (e.g., vehicle information database 132, real-world environment database 134, virtual environment database 136, virtual reality content database 138, or other electronic storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together to provide the functionality attributed herein to the servers. For example, the computing devices may be implemented by a cloud of computing platforms operating together as the computing devices.

The electronic storages may include non-transitory storage media that electronically stores information. The electronic storage media of the electronic storages may include one or both of system storage that is provided integrally (e.g., substantially non-removable) with the servers or removable storage that is removably connectable to the servers via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information received from the servers, information received from client computing platforms, or other information that enables the servers to function as described herein.

The processors may be programmed to provide information processing capabilities in the servers. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-124 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-124 described herein is for illustrative purposes, and is not intended to be limiting, as any of subsystems 112-124 may provide more or less functionality than is described. For example, one or more of subsystems 112-124 may be eliminated, and some or all of its functionality may be provided by other ones of subsystems 112-124. As another example, additional subsystems may be programmed to perform some or all of the functionality attributed herein to one of subsystems 112-124.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method implemented by one or more processors that, when executed by the processors, perform the method, the method comprising: obtaining destination information associated with the vehicle, wherein the destination information comprises information indicating a destination location of the vehicle; obtaining virtual reality content based on the destination information, wherein the virtual reality content comprises one or more content portions related to one or more portions of a virtual route, the one or more virtual route portions corresponding to one or more portions of a real-world route to the destination location; monitoring the current location of the vehicle with respect to the one or more real-world route portions; and causing, via one or more output devices of the vehicle, a presentation of a content portion related to a virtual route portion of the one or more virtual route portions responsive to a determination, based on the monitoring, that the vehicle is on a real-world route portion that corresponds to the virtual route portion, wherein the one or more content portions comprise the presented content portion.

2. The method of embodiment 1, wherein the one or more output devices comprise one or more of windshield-integrated output devices or window-integrated output devices, and wherein the presentation of the content portion is caused to be provided via one or more of the windshield-integrated output devices or the window-integrated output devices.

3. The method of any of embodiments 1-2, wherein the one or more output devices comprise one or more of door-integrated output devices, seat-integrated output devices, floor-integrated output devices, or ceiling-integrated output devices, and wherein the presentation of the content portion is caused to be provided via one or more of the door-integrated output devices, the seat-integrated output devices, the floor-integrated output devices, or the ceiling-integrated output devices.

4. The method of any of embodiments 1-3, wherein the current location of the vehicle is in a first real-world environment, and the virtual reality content is a virtual representation of a second real-world environment different from the first real-world environment, and wherein the virtual reality content is based on one or more characteristics of the second real-world environment.

5. The method of any of embodiments 1-3, wherein the current location of the vehicle is in a first real-world environment, and the virtual reality content is a virtual representation of the first real-world environment at a time different from the current time, and wherein the virtual reality content is based on one or more characteristics of the first real-world environment at the different time.

6. The method of embodiment 5, wherein the different time is a time prior to the current time or a time subsequent to the current time.

7. The method of any of embodiments 1-6, wherein the virtual reality content comprises one or more of audio content portions, visual content portions, or haptic content portions.

8. A method implemented by one or more processors that, when executed by the processors, perform the method, the method comprising: obtaining destination information associated with a vehicle, wherein the destination information comprises information indicating a destination location of the vehicle; obtaining, based on the destination information, real-world route information associated with a real-world route to the destination location, wherein the real-world route information comprises information related to one or more portions of the real-world route to the destination location; determining, based on the real-world route information, one or more portions of a virtual route that correspond to the one or more real-world route portions; generating virtual reality content based on the one or more virtual route portions such that the virtual reality content comprises one or more content portions related to the one or more virtual route portions; and causing a presentation of the virtual reality content to be provided via one or more output devices of the vehicle.

9. The method of embodiment 8, wherein the one or more output devices comprise one or more of windshield-integrated output devices or window-integrated output devices, and wherein the presentation of the virtual reality content is caused to be provided via one or more of the windshield-integrated output devices or the window-integrated output devices.

10. The method of any of embodiments 8-9, wherein the one or more output devices comprise one or more of door-integrated output devices, seat-integrated output devices, floor-integrated output devices, or ceiling-integrated output devices, and wherein the presentation of the virtual reality content is caused to be provided via one or more of the door-integrated output devices, the seat-integrated output devices, the floor-integrated output devices, or the ceiling-integrated output devices.

11. The method of any of embodiments 8-10, wherein the virtual reality content comprises one or more content portions related to the one or more virtual route portions, the method further comprising: monitoring the current location of the vehicle with respect to the one or more real-world route portions; and causing, via the one or more output devices of the vehicle, a presentation of a content portion related to a virtual route portion of the one or more virtual route portions responsive to a determination, based on the monitoring, that the vehicle is on a real-world route portion that corresponds to the virtual route portion.

12. The method of any of embodiments 8-11, wherein the current location of the vehicle is in a first real-world environment, and the virtual reality content is a virtual representation of a second real-world environment different from the first real-world environment, and wherein the virtual reality content is based on one or more characteristics of the second real-world environment.

13. The method of embodiment 12, wherein the information related to the one or more real-world route portions indicates one or more first route characteristics of the one or more real-world route portions, and the one or more characteristics of the second real-world environment comprises one or more second route characteristics, and wherein the one or more virtual route portions are determined based on the one or more second route characteristics being similar to the one or more first route characteristics.

14. The method of any of embodiments 8-11, wherein the current location of the vehicle is in a first real-world environment, and the virtual reality content is a virtual representation of the first real-world environment at a time different from the current time, and wherein the virtual reality content is based on one or more characteristics of the first real-world environment at the different time.

15. The method of embodiment 14, wherein the different time is a time prior to the current time or a time subsequent to the current time.

16. The method of any of embodiments 8-15, wherein the virtual reality content comprises one or more of audio content portions, visual content portions, or haptic content portions.

17. A tangible, non-transitory, machine-readable medium storing instructions that when executed by a data processing apparatus cause the data processing apparatus to perform operations comprising those of any of embodiments 1-16.

18. A system, comprising: one or more processors; and memory storing instructions that when executed by the processors cause the processors to effectuate operations comprising those of any of embodiments 1-16.

19. A system, comprising an in-vehicle computer system that includes one or more processors; and memory storing instructions that when executed by the processors cause the in-vehicle computer system to effectuate operations comprising those of any of embodiments 1-16.

What is claimed is:

1. A computer system for facilitating a virtual reality presentation based on a real-world route of a vehicle, the computer system comprising:
one or more processors programmed with computer program instructions that, when executed, cause the computer system to:
obtain, from a real-world environment database, real-world information comprising slope information and other real-world environment information, the slope information indicating (i) slopes of a first real-world route in a first real-world environment in which a vehicle is located and (ii) other slopes for other real-world environments, the other slopes comprising slopes of a second real-world route in a second real-world environment, the first real-world route being from a current location associated with the vehicle to a destination location associated with the vehicle, the slopes of the first real-world route comprising inclines and declines of the first real-world route;
select the second real-world route in the second real-world environment for a virtual reality presentation within the vehicle on the first real-world route based on similarities between the slopes of the first real-world route and the slopes of the second real-world route, wherein the slopes of the first real-world route are similar to but not the same as the slopes of the second real-world route, and the first and second real-world environments are different regions on Earth;
obtain, while the vehicle is on the first real-world route, virtual reality content representative of the second real-world route based on the selection of the second real-world route;
monitor the current location of the vehicle with respect to the first real-world route; and
cause, while the vehicle is on the first real-world route, a presentation of the virtual reality content representative of the second real-world route via one or more output devices of the vehicle, the presentation of virtual reality content being based on the monitoring of the current location of the vehicle.

2. The computer system of claim 1, wherein the first and second real-world environments are regions on Earth that are mutually exclusive of one another.

3. The computer system of claim 1, wherein selecting the second real-world route in the second real-world environment comprises selecting the second real-world route in the second real-world environment for the virtual reality presentation within the vehicle on the first real-world route based on (i) the similarities between the slopes of the first real-world route and the slopes of the second real-world route and (ii) similarities between other characteristics of the first real-world route and other characteristics of the second real-world route, the other characteristics of the first and second real-world routes comprising weather, horizontal curves, turns, or road conditions.

4. The computer system of claim 1, wherein the virtual reality content comprises one or more audio content portions, visual content portions, or haptic content portions.

5. The computer system of claim 1, wherein the one or more output devices comprise one or more windshield-integrated output devices, window-integrated output devices, door-integrated output devices, seat-integrated output devices, floor-integrated output devices, or ceiling-integrated output devices.

6. A method comprising:
obtaining, by one or more processors, real-world environment information indicating (i) environmental characteristics of a first real-world route in a first real-world environment in which a vehicle is located and (ii) other environment characteristics for other real-world environments, the other environment characteristics comprising environmental characteristics of a second real-world route in a second real-world environment, the first real-world route being from a current location associated with the vehicle to a destination location associated with the vehicle;

determining, by one or more processors, a match between the first real-world route in the first real-world environment and the second real-world route in the second real-world environment based on similarities between the environmental characteristics of the first real-world route and the environmental characteristics of the second real-world route, wherein the environmental characteristics of the first real-world route are similar to but not the same as the environmental characteristics of the second real-world route, and the second real-world environment is different from the first real-world environment;

obtaining, by one or more processors, while the vehicle is on the first real-world route, virtual reality content representative of the second real-world route for a virtual reality presentation within the vehicle on the first real-world route based on the determined match between the first real-world route and the second real-world route; and causing, by one or more processors, while the vehicle is on the first real-world route, a presentation of the virtual reality content representative of the second real-world route via one or more output devices of the vehicle.

7. The method of claim 6, further comprising:

monitoring, by one or more processors, the current location of the vehicle with respect to the first real-world route, wherein the presentation of virtual reality content representative of the second real-world route while the vehicle is on the first real-world route is based on the monitoring of the current location of the vehicle.

8. The method of claim 6, wherein the first and second real-world environments are regions on Earth that are mutually exclusive of one another.

9. The method of claim 6, wherein the first and second real-world environments correspond to a same region on Earth at different times such that the environmental characteristics of the second real-world route reflect measurements taken of the same region years prior to measurements taken of the same region and reflected by the environment characteristics of the first real-world route.

10. The method of claim 6, further comprising:

determining, by one or more processors, slopes of the first real-world route on which the vehicle is currently traveling and slopes of the second real-world route not currently being traveled by the vehicle, wherein determining the match comprises determining the match between the first real-world route in the first real-world environment and the second real-world route in the second real-world environment based on similarities between the slopes of the first real-world route and the slopes of the second real-world route.

11. The method of claim 6, further comprising:

determining, by one or more processors, curves of the first real-world route on which the vehicle is currently traveling and curves of the second real-world route not currently being traveled by the vehicle, wherein determining the match comprises determining the match between the first real-world route in the first real-world environment and the second real-world route in the second real-world environment based on similarities between the curves of the first real-world route and the curves of the second real-world route.

12. The method of claim 6, wherein the environmental characteristics of the first and second real-world routes comprise weather, curves, turns, inclines, declines, or road conditions.

13. The method of claim 6, wherein the virtual reality content comprises one or more audio content portions, visual content portions, or haptic content portions, and wherein the one or more output devices comprise one or more windshield-integrated output devices, window-integrated output devices, door-integrated output devices, seat-integrated output devices, floor-integrated output devices, or ceiling-integrated output devices.

14. A non-transitory computer-readable storage medium comprising instructions that, when executed by one or more processors, perform operations comprising:

determining environmental characteristics of a first real-world route in a first real-world environment in which a vehicle is located, the first real-world route being from a current location associated with the vehicle to a destination location associated with the vehicle;

determining a match between the first real-world route in the first real-world environment and a second real-world route in a second real-world environment based on similarities between the environmental characteristics of the first real-world route and environmental characteristics of the second real-world route, wherein the environmental characteristics of the first real-world route are similar to but not the same as the environmental characteristics of the second real-world route, and the second real-world environment is different from the first real-world environment;

obtaining, while the vehicle is on the first real-world route, virtual reality content representative of the second real-world route for a virtual reality presentation within the vehicle on the first real-world route based on the determined match between the first real-world route and the second real-world route; and causing, while the vehicle is on the first real-world route, a presentation of the virtual reality content representative of the second real-world route via one or more output devices of the vehicle.

15. The non-transitory computer-readable storage medium of claim 14, the operations further comprising:

querying one or more real-world environment databases to obtain real-world environment information, the real-world environment information comprising (i) information specifying the environmental characteristics of the first real-world route and (ii) information specifying other environment characteristics for other real-world environments, the other environment characteristics comprising the environmental characteristics of the second real-world route; and monitoring the current location of the vehicle with respect to the first real-world route, wherein the presentation of virtual reality content representative of the second real-world route while the vehicle is on the first real-world route is based on the monitoring of the current location of the vehicle and the obtainment of the real-world environment information.

16. The non-transitory computer-readable storage medium of claim 14, wherein the first and second real-world environments are regions on Earth that are mutually exclusive of one another.

17. The non-transitory computer-readable storage medium of claim 14, wherein the first and second real-world environments correspond to a same region on Earth at different times such that the environmental characteristics of the second real-world route reflect measurements taken of the same region years prior to measurements taken of the same region and reflected by the environment characteristics of the first real-world route.

18. The non-transitory computer-readable storage medium of claim 14, the operations further comprising:
   determining slopes of the first real-world route on which the vehicle is currently traveling and slopes of the second real-world route not currently being traveled by the vehicle,
   wherein determining the match comprises determining the match between the first real-world route in the first real-world environment and the second real-world route in the second real-world environment based on similarities between the slopes of the first real-world route and the slopes of the second real-world route.

19. The non-transitory computer-readable storage medium of claim 14, wherein the environmental characteristics of the first and second real-world routes comprise weather, curves, turns, inclines, declines, or road conditions.

20. The non-transitory computer-readable storage medium of claim 14, wherein the virtual reality content comprises one or more audio content portions, visual content portions, or haptic content portions, and wherein the one or more output devices comprise one or more windshield-integrated output devices, window-integrated output devices, door-integrated output devices, seat-integrated output devices, floor-integrated output devices, or ceiling-integrated output devices.

\* \* \* \* \*